(12) United States Patent
Söderberg et al.

(10) Patent No.: US 12,008,425 B2
(45) Date of Patent: Jun. 11, 2024

(54) FINGERPRINT SUB-IMAGE CAPTURE

(71) Applicant: Fingerprint Cards Anacatum IP AB, Gothenburg (SE)

(72) Inventors: Per Söderberg, Mölnlycke (SE); Daniel Nygren, Gothenburg (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 0 days.

(21) Appl. No.: 17/914,911

(22) PCT Filed: Apr. 9, 2021

(86) PCT No.: PCT/SE2021/050326
§ 371 (c)(1),
(2) Date: Sep. 27, 2022

(87) PCT Pub. No.: WO2021/211036
PCT Pub. Date: Oct. 21, 2021

(65) Prior Publication Data
US 2023/0140424 A1 May 4, 2023

(30) Foreign Application Priority Data

Apr. 15, 2020 (SE) .................................... 2050426-2

(51) Int. Cl.
*G06V 40/13* (2022.01)
*G06F 21/32* (2013.01)
(Continued)

(52) U.S. Cl.
CPC ......... *G06K 19/0718* (2013.01); *G06F 21/32* (2013.01); *G06K 19/07354* (2013.01);
(Continued)

(58) Field of Classification Search
None
See application file for complete search history.

(56) References Cited

U.S. PATENT DOCUMENTS 6,330,345 B1 * 12/2001 Russo ................ G06V 40/1347
358/463
10,977,470 B1 * 4/2021 Chang ................... H04L 9/3231
(Continued)

FOREIGN PATENT DOCUMENTS

WO 2016055665 A1 4/2016
WO 2017018921 A1 2/2017
(Continued)

OTHER PUBLICATIONS

PCT International Search Report and Written Opinion for International Application No. PCT/SE2021/050326 dated Jun. 3, 2021, 11 pages.

*Primary Examiner* — Joseph R Haley
(74) *Attorney, Agent, or Firm* — RMCK Law Group, PLC

(57) ABSTRACT

A method of a fingerprint sensing system arranged in a smartcard configured to acquire fingerprint data of a user with a fingerprint sensor for biometric authentication, and a fingerprint sensing system performing the method. The method comprises detecting a finger of the user contacting a sensing area of the fingerprint sensor, initializing the fingerprint sensor with a predetermined sensor setting, acquiring a calibration sub-image which is confined in size to a subarea of the sensing area, determining whether or not a quality criterion is met for the acquired calibration sub-image, and if so acquiring one or more further sub-images confined in size to a subarea of the sensing area during a time period when the smartcard is not engaged in waiting time extension request signalling with a card reader, and combining a plurality of the acquired further sub-images into a representation of a fingerprint of the user.

19 Claims, 12 Drawing Sheets

(51) Int. Cl.
    *G06K 19/07*         (2006.01)
    *G06K 19/073*       (2006.01)
    *G06T 5/50*          (2006.01)
    *G06T 7/80*          (2017.01)
    *G06V 40/12*        (2022.01)

(52) U.S. Cl.
    CPC ................ *G06T 5/50* (2013.01); *G06T 7/80* (2017.01); *G06V 40/1306* (2022.01); *G06V 40/1335* (2022.01); *G06V 40/1365* (2022.01); *G06T 2207/20021* (2013.01); *G06T 2207/20221* (2013.01)

(56) References Cited

U.S. PATENT DOCUMENTS

| | | |
|---|---|---|
| 2016/0379038 A1 | 12/2016 | Vural et al. |
| 2018/0253587 A1 | 9/2018 | Lowe |
| 2018/0276519 A1 | 9/2018 | Benkley, III et al. |
| 2021/0034834 A1* | 2/2021 | Mackin .................. G06F 21/84 |

FOREIGN PATENT DOCUMENTS

| | | |
|---|---|---|
| WO | 2019175179 A1 | 9/2019 |
| WO | 2020051801 A1 | 3/2020 |

\* cited by examiner

FINGERPRINT SUB-IMAGE CAPTURE

CROSS-REFERENCE TO RELATED APPLICATIONS

This application is a 371 U.S. National Stage of International Application No. PCT/SE2021/050326, filed Apr. 9, 2021, which claims priority to Swedish Patent Application No. 2050426-2, filed Apr. 15, 2020. The disclosures of each of the above applications are incorporated herein by reference in their entirety.

TECHNICAL FIELD

The present disclosure relates to a method of a fingerprint sensing system arranged in a smartcard configured to acquire fingerprint data of a user with a fingerprint sensor for biometric authentication, and a fingerprint sensing system performing the method.

BACKGROUND

In a fingerprint sensing system, a fingerprint sensor of the system must be initialized with correct settings in order to be able to acquire fingerprint images of high quality to be used by a device being equipped with the fingerprint sensor for authenticating an individual to which the fingerprint belongs. Parameters of the fingerprint sensor to be initialized included e.g. sensor gain, offset of an analogue-to-digital converter (ADC) of the sensor, pixel sensitivity, etc.

This initialization is undertaken upon the fingerprint sensor detecting a finger touching a sensing area of the sensor, where the sensor transits from a sleep mode to an active mode. When transiting to the active mode, the sensor captures a sub-image of the finger touching the sensing area whereupon the sub-image is evaluated for determining whether it is of sufficient quality. A sub-image is a fingerprint image associated with a relatively small section of the sensing area of the sensor.

If not, the sensor settings are slightly changed, and a new sub-image is captured, and so on, until a sub-image is captured which is considered to be of sufficiently high quality. The sensor settings applied when capturing this image will as a result be the settings used for capturing one or more full fingerprint images from which the individual may be authenticated.

However, this initialization process is time consuming and processing-heavy, in particular if the fingerprint sensor in implemented in a device such as a smart card where timing restrictions are harsh.

SUMMARY

One object is to solve, or at least mitigate this problem in that art, and thus provide an improved method of acquiring fingerprint data of a user with a fingerprint sensor in a smartcard for biometric authentication.

This object is attained in a first aspect by a method of a fingerprint sensing system arranged in a smartcard, the fingerprint sensing system being configured to acquire fingerprint data of a user with a fingerprint sensor for biometric authentication. The method comprising detecting a finger of the user contacting a sensing area of the fingerprint sensor, initializing the fingerprint sensor with a predetermined sensor setting, acquiring, for the finger being detected to contact the sensing area of the fingerprint sensor, a calibration sub-image which is confined in size to a subarea of the sensing area, determining whether or not a quality criterion is met for the acquired calibration sub-image, and if so acquiring (S505) one or more further sub-images confined in size to a subarea of the sensing area, and combining a plurality of the acquired further sub-images into a representation of a fingerprint of the user, wherein the further sub-images are acquired during a time period when the smartcard is not engaged in waiting time extension (WTX) request signalling with a card reader with which the smartcard performs contactless communication.

This object is attained in a second aspect by a fingerprint sensing system arranged in a smartcard, the fingerprint sensing system comprising a fingerprint sensor being configured to acquire fingerprint data of a user for biometric authentication, and a processing unit being configured to cause the fingerprint system to be operative to detect a finger of the user contacting a sensing area of the fingerprint sensor, initialize the fingerprint sensor with a predetermined sensor setting, acquire, for the finger being detected to contact the sensing area of the fingerprint sensor, a calibration sub-image which is confined in size to a subarea of the sensing area, determine whether or not a quality criterion is met for the acquired calibration sub-image, and if so to acquire one or more further sub-images confined in size to a subarea of the sensing area, and to combine a plurality of the acquired further sub-images into a representation of a fingerprint of the user, wherein the further sub-images are acquired during a time period when the smartcard is not engaged in WTX request signalling with a card reader with which the smartcard performs contactless communication.

Thus, the fingerprint sensor detects that a finger contacts a sensing area of the sensor. Thereafter, or even before, the fingerprint sensor is initialized with a predetermined sensor setting. This may be a default setting which empirically may have proven to result in captured images of a high quality.

Then, a calibration sub-image is acquired by the fingerprint sensor being initialized with the default settings, which is used for determining whether or not the sensor settings are adequate or if they need to be adjusted. In order to be able to use a fingerprint image for biometric authentication of the user, the quality of the image must be sufficiently high.

If not, it is not feasible to match the captured fingerprint image to previously enrolled fingerprint templates of the fingerprint sensing system. Hence, the processor determines whether or not the quality of the captured calibration sub-image complies with a predetermined quality criterion. For instance, the perceived quality of the image must be sufficiently high.

If so, the processor proceeds with controlling the fingerprint sensor to capture further sub-images using the default sensor settings.

It should be noted that the calibration sub-image typically is smaller than the further sub-images subsequently being captured for the purpose of performing authentication of the fingerprint of the user, which further sub-images in their turn are smaller than a full fingerprint image. For instance, if the size of the sensing area of the sensor is 160×160 pixels, the further sub-images may have a size of 40×160 pixels, while the calibration sub-image is e.g. 32×24 pixels.

The captured further sub-images captured are continuously being written into a respective location of memory as they are being captured. The capturing of the further sub-images is repeated until a sufficient number of sub-images have been captured, such that a fully or partly complete fingerprint image subsequently can be read out from the memory. For instance, 2-4 further sub-images are captured and written into the memory, but this may vary dependent on configuration of the system.

After having captured a sufficient number of sub-images these sub-images are read out, and thus combined, by the processor into one single image representing the fingerprint of the user.

These further sub-images are advantageously captured during a part of a WTX period when the smartcard is not engaged in WTX request signalling with a card reader in order to avoid performing processing-heavy operations during a period when the smartcard is harvesting energy from signals being received wirelessly from the card reader.

In an embodiment, in case the quality criterion is not met for the calibration sub-image, the processor modifies the sensor settings based on data derived from the acquired calibration sub-image for which the quality criterion is not met. Thereafter, the fingerprint sensor is reinitialized with the modified sensor settings, and a new calibration sub-image is acquired using the modified sensor settings. In case the quality criterion is not met for the acquired new calibration sub-image, the sensor settings are modified until a calibration sub-image is captured for which the quality criterion is met.

In an embodiment, the processor detects whether or not the finger is stable on the sensing area of the sensor and if so proceeds to initialize the fingerprint sensor with a pre-determined sensor setting, and if not detection of a finger of the user contacting a sensing area of the fingerprint sensor is restarted.

In an embodiment, the processor detects whether or not the finger is stable on the sensing area, and if not the acquired further sub-images are discarded.

In an embodiment, the acquiring of any sub-images—the calibration sub-images as well as the further sub-images—are scheduled to be performed during a part of a WTX period when the smartcard is not engaged in WTX request signalling with the card reader.

In an embodiment, one or more of the detection of a finger, detection whether or not the finger is stable on the sensing area, and initializing and re-initializing the fingerprint sensor is performed during a time period when the smartcard is not engaged in WTX request signalling with the card reader.

In a third aspect, a computer program is provided comprising computer-executable instructions for causing a fingerprint sensing system to perform the method of the first aspect when the computer-executable instructions are executed on a processing unit included in the fingerprint sensing system.

In a fourth aspect, a computer program product is provided comprising a computer readable medium, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
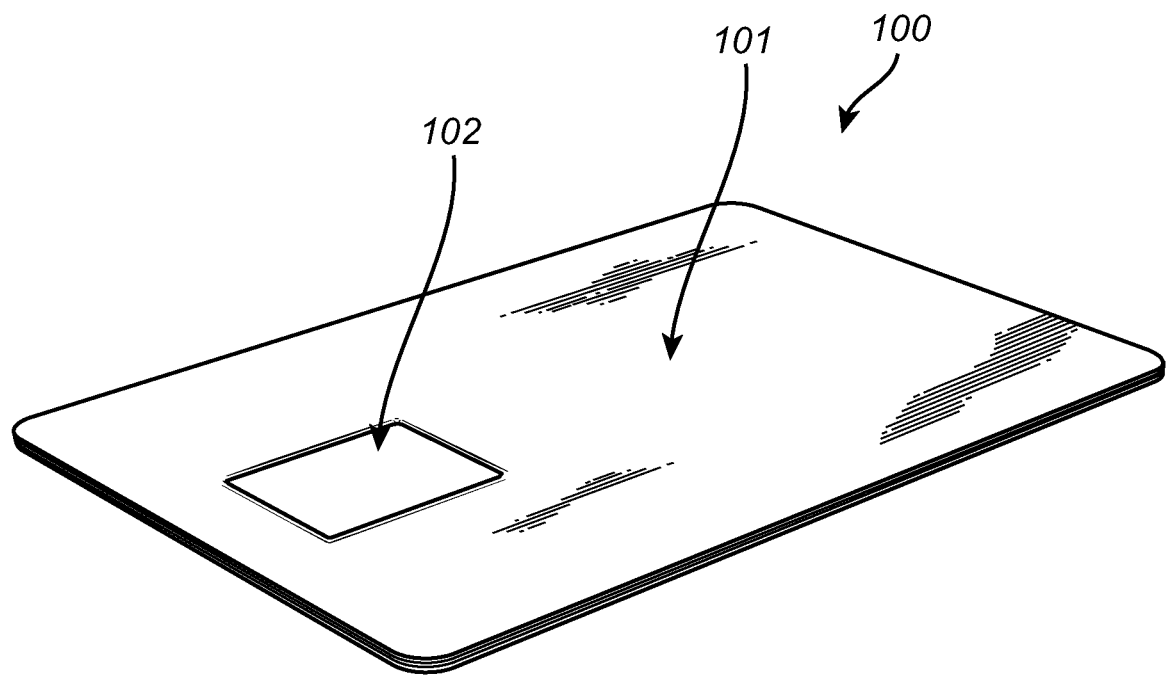
FIG. 1 schematically illustrates a smartcard comprising a bendable main body and a biometric sensor such as a fingerprint sensor for authorizing transactions carried out using the smart card.
Figure 2:
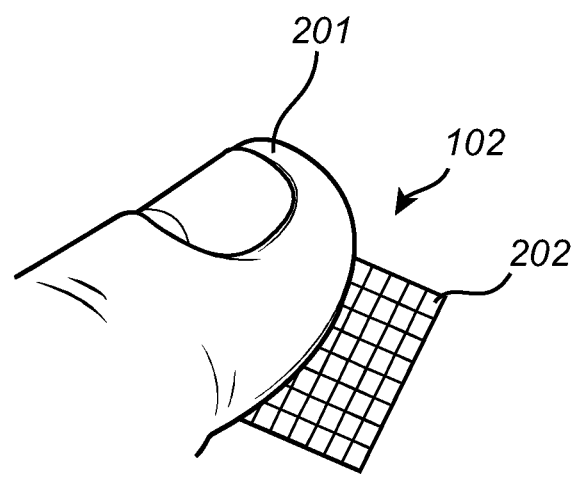
FIG. 2 illustrates an enlarged view of the fingerprint sensor onto which a user places her finger.
Figure 3:
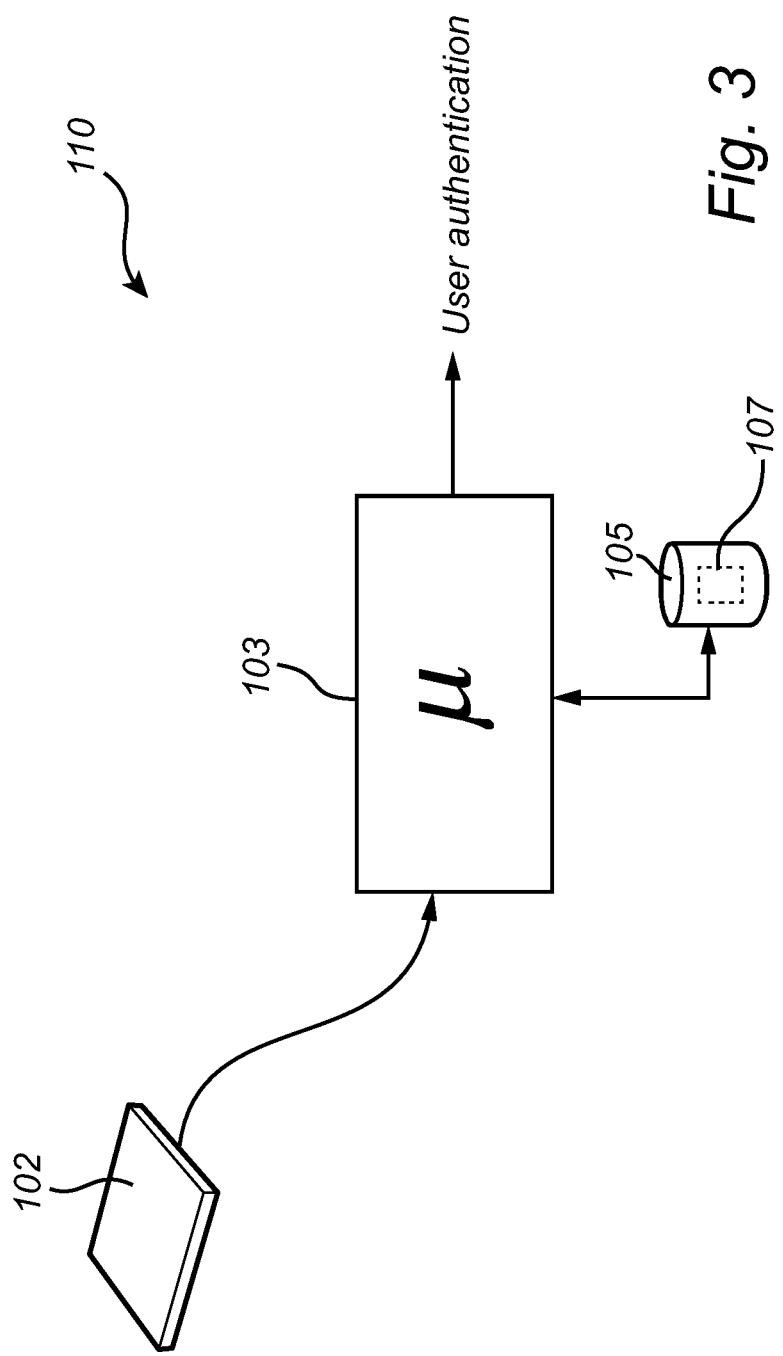
FIG. 3 shows the fingerprint sensor being part of a fingerprint sensing system.

FIGS. 1-3 illustrates a fingerprint sensing system in which embodiments may be implemented.

FIG. 1 schematically illustrates a smartcard 100 comprising a bendable main body 101 and a biometric sensor 102 such as a fingerprint sensor for authorizing transactions carried out using the smartcard 100.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

FIG. 2 illustrates a somewhat enlarged view of the fingerprint sensor 102 onto which a user places her finger 201. The fingerprint sensor 102 is configured to comprise a plurality of sensing elements. A single sensing element (also denoted as a pixel) is in FIG. 2 indicated by reference numeral 202.

FIG. 3 shows the fingerprint sensor 102 being part of a fingerprint sensing system 110 implemented in e.g. the smartcard 100 of FIG. 1. The fingerprint sensing system 110 comprises the fingerprint sensor 102 and a processing unit 103, such as one or more microprocessors, for controlling the fingerprint sensor 102 and for analysing captured fingerprints. The fingerprint sensing system 110 further comprises a memory 105. The fingerprint sensing system 110 in turn, typically, forms part of the smartcard 100 as exemplified in FIG. 1. The sensor 102 and the processing unit 103 may both perform tasks of an authentication process. It may further be envisaged than in case a sensor with sufficient processing power is utilized, the sensor 102 may take over authentication tasks from the processing unit 103, and possibly even replace the processing unit 103.

The fingerprint sensor 102 may be implemented using any kind of current or future fingerprint sensing principle, including for example capacitive, optical, ultrasonic or thermal sensing technology.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised previously enrolled fingerprint templates pre-stored in the memory 105.

In a general authorization process, the user places a finger 201 on a sensing area of the fingerprint sensor 102. The processing unit 103 evaluates the captured fingerprint and compares it to one or more enrolled authenticated fingerprint templates stored in the memory 105. If the recorded fingerprint matches the pre-stored template, the user is authenticated and the processing unit 103 will accordingly inform e.g. a point-of-sale (POS) terminal with which it is involved in a transaction process such that the transaction undertaken is authenticated.

With reference again to FIG. 3, the steps of the method performed by the fingerprint sensing system 110 are in practice performed by the processing unit 103 embodied in the form of one or more microprocessors arranged to execute a computer program 107 downloaded to the storage medium 105 associated with the microprocessor, such as a RAM, a Flash memory or a hard disk drive. Alternatively, the computer program is included in the memory (being for instance a NOR flash) during manufacturing. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
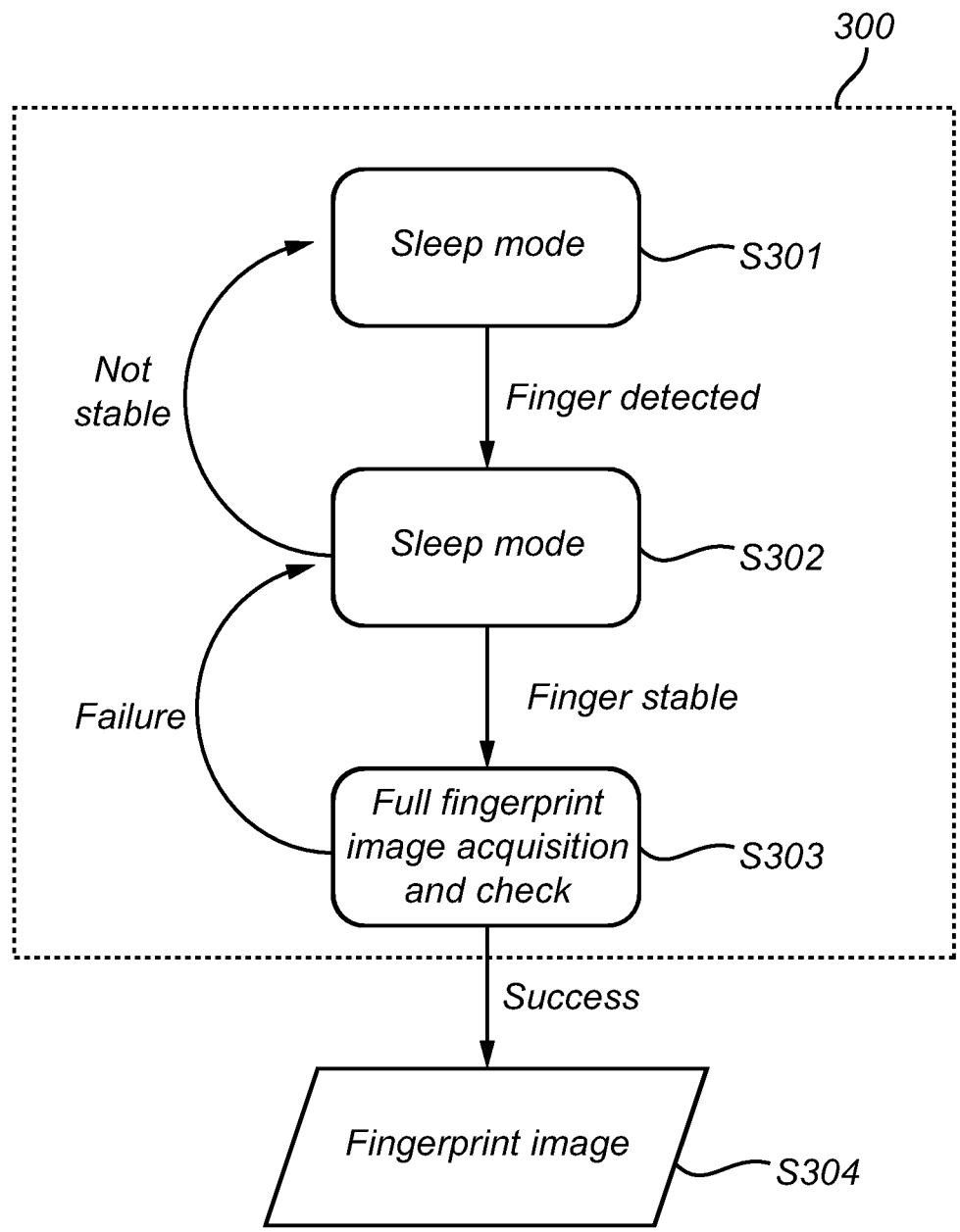
FIG. 4 illustrates a general prior art sensor initialization process being performed in order to subsequently enable a fingerprint sensor to capture a fingerprint image.

FIG. 4 illustrates a general prior art sensor initialization process 300 being performed in order to subsequently enable the fingerprint sensor 102 to capture a full fingerprint image in step S304.

In a first step S301 designated "sleep mode", the processor 103 controlling the sensor 102, which performs software and/or hardware based finger stable detection, is in a low-power mode where groups of sensor elements 202 located at group-wise spaced apart positions in an array of sensor elements are monitored.

When more than a threshold number of sensor elements 202 indicate a touch of a finger 201, the finger 201 is indeed detected and a transition to a second state designated "finger stable search" is performed in step S302, i.e. the sensor 102 exits the sleep mode of step S301 and enters an active mode.

While in the "finger stable search" state of step S302, sub-images are captured and processed to determine whether the finger 201 being pressed against the sensor 102 is stable or not.

When capturing a sub-image, a sub-section of the sensing area of sensor 102 is selected to capture an image of the finger 201 touching the sub-section. The sub-section is an area which is confined in size with respect to the total sensing area. The image captured of the part of the finger 201 touching the sub-section is referred to as a sub-image. As an example, while the total sensing area may amount to for instance 160×160 or 96×96 sensing elements (aka. pixels), the sub-section may constitute 40×160 pixels and 24×96 pixels, respectively.

In case the processing of sub-images in step S302 does not result in a stable state being determined and a termination criterion is satisfied, the touch is considered "not stable" and a transition back to the sleep mode in step S301 is performed.

A termination criterion may be that a time-out is reached e.g. started from the point in time when a first sub-image is acquired, or when a threshold number of sub-images have been acquired without a stable state being identified or when a statistical indicator exceeds a predefined criterion indicating a non-convergence towards a stable state.

If to the contrary a stable state is reached, a transition to a state designated "full fingerprint image acquisition and check" is performed in step S303. In this state a full fingerprint image is acquired. Optionally, a check of the quality of the full fingerprint image is performed.

In case the quality check is not performed, the full fingerprint image is provided unconditionally in step S304. In case the quality check is performed, the full fingerprint image is provided conditioned on a successful outcome (designated "Success") of the quality check. In a further alternative, the full fingerprint image is provided in any event but is assigned with a value indicating the outcome of the quality check.

If the outcome of the quality check is that the quality is not sufficiently high (designated as "Failure") in step S303, a transition back to the sleep mode of step S301 is performed, optionally comprising a step of prompting a user to repeat the touch.

Figure 5:
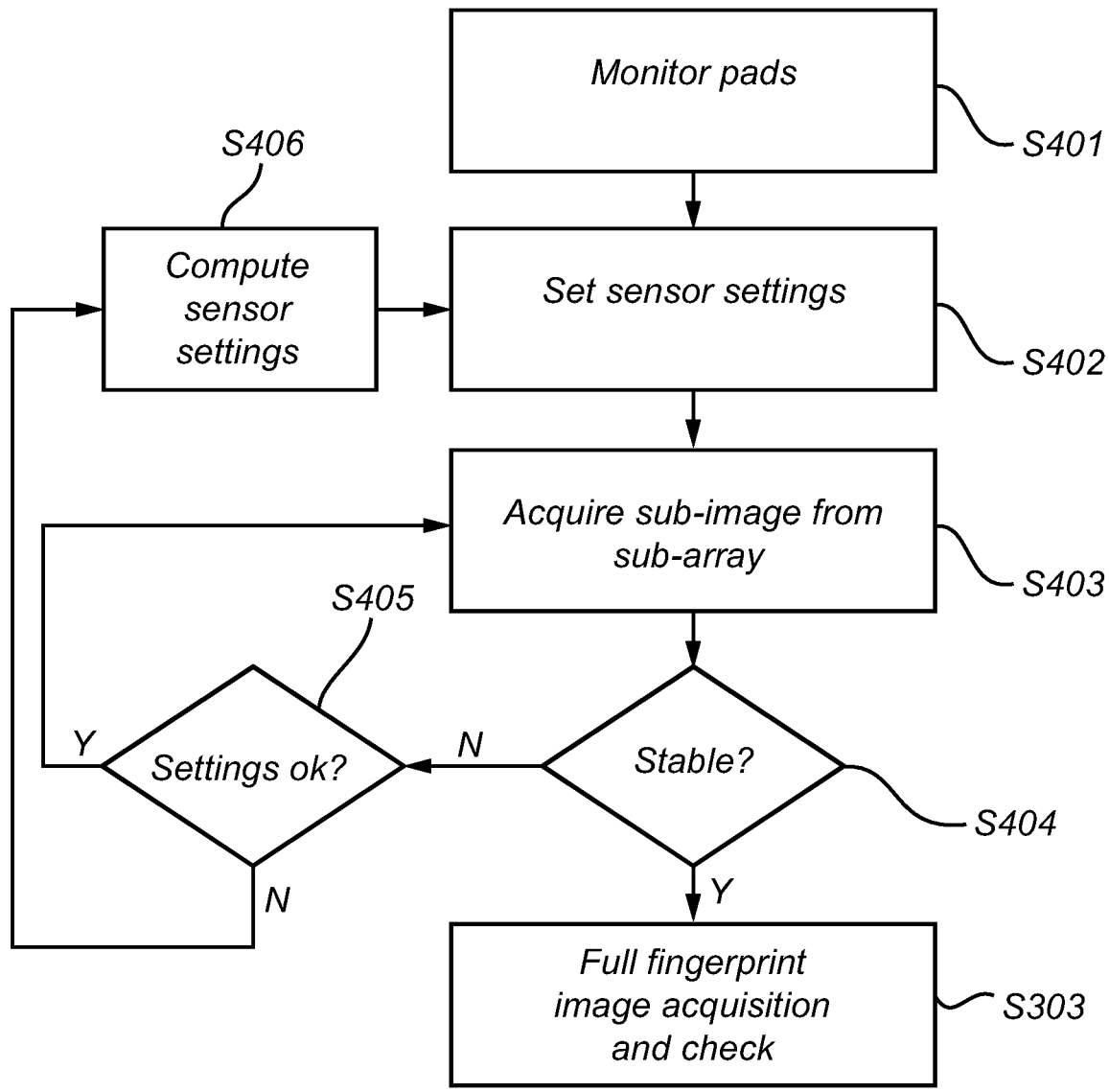
FIG. 5 illustrates in more detail steps performed in the finger stable search of FIG. 4.

FIG. 5 illustrates in more detail the actions of step S302 of performing a finger stable search.

Now, after a threshold number of sensor elements 202 have been detected to have been touched by a finger 201 in step S401, the processor 103 initializes in step S402 the fingerprint sensor 102 with selected settings. At a first run of the method, default settings may be used to initialize the sensor 102 in step S402.

Then, in step S403, a sub-section of the sensing area of sensor 102 is selected to capture a sub-image of the finger 201 touching the sub-section.

From data derived from the captured sub-image, properties are computed indicating stability, i.e. whether or not the finger touching the sensing area of the sensor 102 is stable.

For instance, statistical indicators may be computed comprising a mean value of intensity values in the captured sub-image, a minimum and/or maximum value, a lower and/or upper quantile or the so-called Kullback-Leibler divergence measure. Alternatively, the Jensen-Shannon divergence could be used instead of the Kullback-Leibler divergence measure.

Based on these computed indicators, a property referred to as slope is computed for the change in intensity change. By evaluating the slope of the values of the statistical indicator over time as the values are computed, it may be concluded that the values of the statistical indicator has reached or is about to reach a stable state when the computed slope is below a predefined slope threshold.

The processor 103 thus determines in step S404, based on the evaluation of how one or more of the slopes develops, whether a stable state is reached or not.

If the finger is stable on the sensing area of the sensor 102, a full image is captured in step S303 as previously described (which in practice may occur after multiple iterations), where optionally a check of the quality of the full fingerprint image is performed in order to determine whether or not the full image should be used for authentication.

If not, the method proceeds to step S405 where the processor 103 evaluates the previously computed the statistical indicators, for instance the minimum and maximum of the intensity values, in order evaluate how the dynamic range of the fingerprint sensor 102 is used. In case the values that are being output from the fingerprint sensor 102 appear to assume values in range close to e.g. the minimum values or the maximum values, it is practically difficult—if not impossible—to derive sensible information about the fingerprint, at least for authorization purposes.

If the computed statistical indicators are evaluated to be adequate, the processor 103 returns to step S403 for capturing another sub-image. It should be noted that this sub-image may be captured by selecting the same sub-area of the sensor 102 as for the previously captured sub-image, but it may also be envisaged that another sub-area is selected. Again, it will be determined in step S404 whether or not finger stability prevails.

In contrast, should the computed statistical indicators by evaluated to be inadequate, the settings of the sensor 102 must be modified, and the method proceeds to step S406, where the sensor settings are modified with the objective to capture a new sub-image having a quality higher than the previous one.

Fingerprint sensor settings which may be changed include one or more of e.g. sensor gain, offset or gain of an analogue-to-digital converter (ADC) of the sensor, pixel sensitivity, exposure time, etc.

Now, in for instance a smartcard in which the fingerprint sensing system 110 may be implemented, the time available for performing fingerprint sensor operations is heavily restricted.

Figure 6:
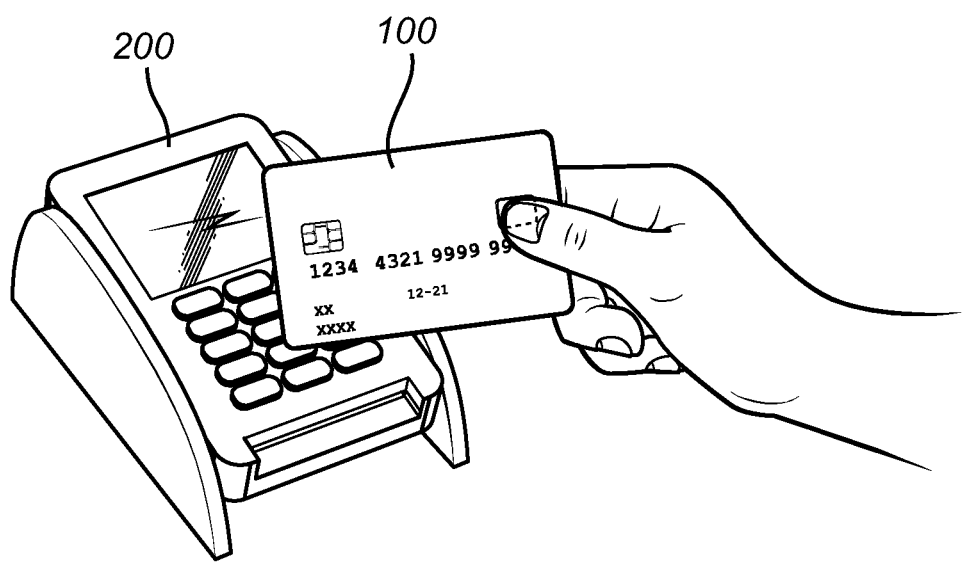
FIG. 6 illustrates a contactless transaction being performed between a credit card and a card reader.

FIG. 6 illustrates a transaction being performed between a credit card 100 and a card reader 200 in the form of a point-of-sale (POS) terminal. The credit card 100 is equipped with a fingerprint sensing system comprising a fingerprint sensor (located under the thumb of the user in FIG. 6) enabling biometric authentication of a user of the credit card 100. The transaction may be performed in a contactless manner, i.e. via wireless communication (as shown in FIG. 6) or via direct physical contact being established by inserting the credit card 100 into the POS terminal 200.

The smart card 100 communicates wirelessly with the POS terminal 200 according to established standards such as ISO14443 and EMVCo. When the wireless connection is established between the smart card 100 and the POS terminal 200 and the POS terminal 200 sends a command to the smart card 100, the standards specify that the POS terminal 200 sets a so-called frame waiting time (FWT) during which the smart card 100 is expected to respond.

If the credit card 100 does not respond within the specified FWT period, a time-out may occur and the connection may be discontinued. The credit card 100 may request an extension of the waiting time before expiry if the FWT, which is referred to as a waiting time extension (WTX) request to which the POS terminal 200 responds by extending the waiting time FWT.

Figure 7:
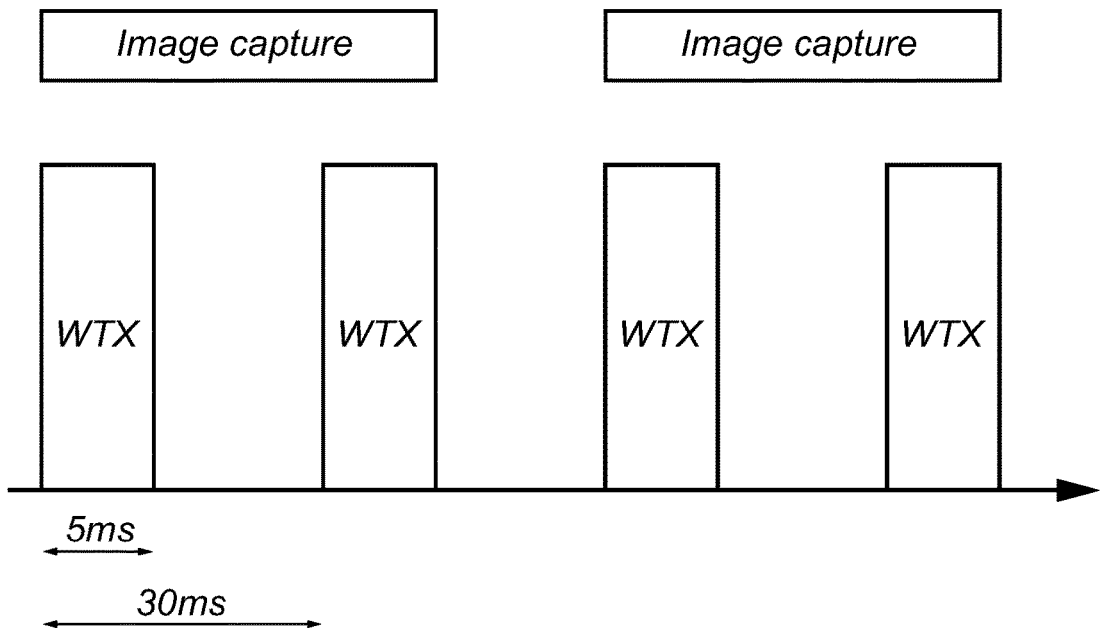
FIG. 7 shows a timing diagram illustrating re-occurring WTX requests and the time periods required for the sensor to capture fingerprint images.

FIG. 7 shows a timing diagram illustrating re-occurring WTX requests and the time periods required for the sensor 102 to capture fingerprint images. As shown, the duration of a WTX request is approximately 5 ms and the WTX requests occur with a period of approximately every 30 ms, while the time required for capturing a full fingerprint image exceeds that period.

For a smart card, near-field communication (NFC) may be performed between the card 100 and the POS terminal 200, wherein the smart card 100 harvests energy from the wireless signal received from the POS terminal 200 for further distribution to other smart card components such as the fingerprint sensing system and transceiver (not shown) via which the communication with the POS terminal is undertaken.

Since the amount of energy being harvested by the card 100 is scarce, priority is to be given to the wireless communication between the smart card 100 and the POS terminal 200 during the WTX request signalling. Thus, no fingerprint images should be captured during the time period of the WTX request signalling. In practice, as illustrated in FIG. 7, this is problematic since the total time for capturing an image exceeds the WTX request signalling period.

Figure 8:
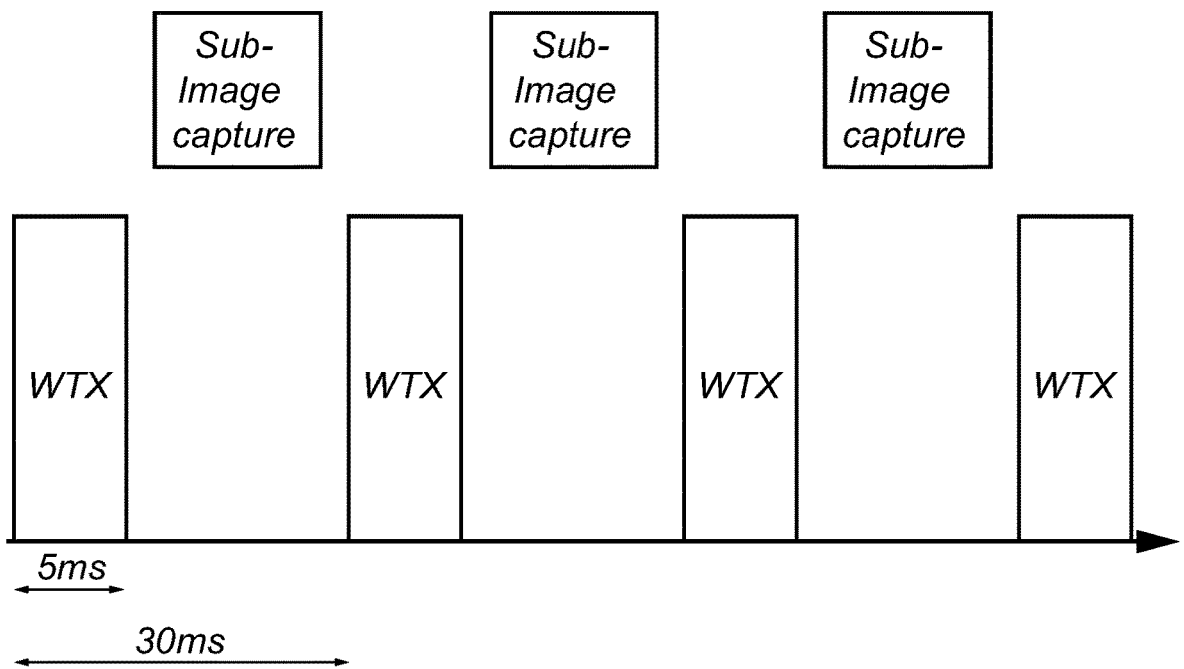
FIG. 8 shows a timing diagram illustrating re-occurring WTX requests and fingerprint images being captured according to an embodiment.

In an embodiment, with reference to FIG. 8 showing a timing diagram, this problem is solved by capturing a number of sub-images during the part of a WTX period when a WTX request is not sent. That is, at some occasion during the 25-ms time slot of the 30-ms WTX period where a WTX request is not sent, one or more sub-images are captured. The sub-images may be captured over a plurality of WTX periods. In this, example three sub-images are captured, each being captured when a WTX request is not sent.

The sub-images are loaded into a memory (e.g. the memory 105) as they are captured, and after a sufficient number of sub-images have been captured, the captured sub-images are read out of the memory and thus combined into a partly or fully complete fingerprint image (i.e. a representation of the fingerprint of the user) to be used for authentication of the user in the transaction between the credit card 100 and the POS terminal 200.

Advantageously, with this approach as shown in FIG. 8, no fingerprint images are captured when a WTX request is sent from the credit card 100 to the POS terminal.

Rather, the processor 103 of the fingerprint sensing system 110 advantageously schedules the acquiring of sub-images to be performed during a WTX period when a WTX request is not sent to the POS terminal 200. As a result, no images are captured during the time period when the smart card 100 harvests energy from communication signals being sent from the POS terminal 200.

Figure 9:
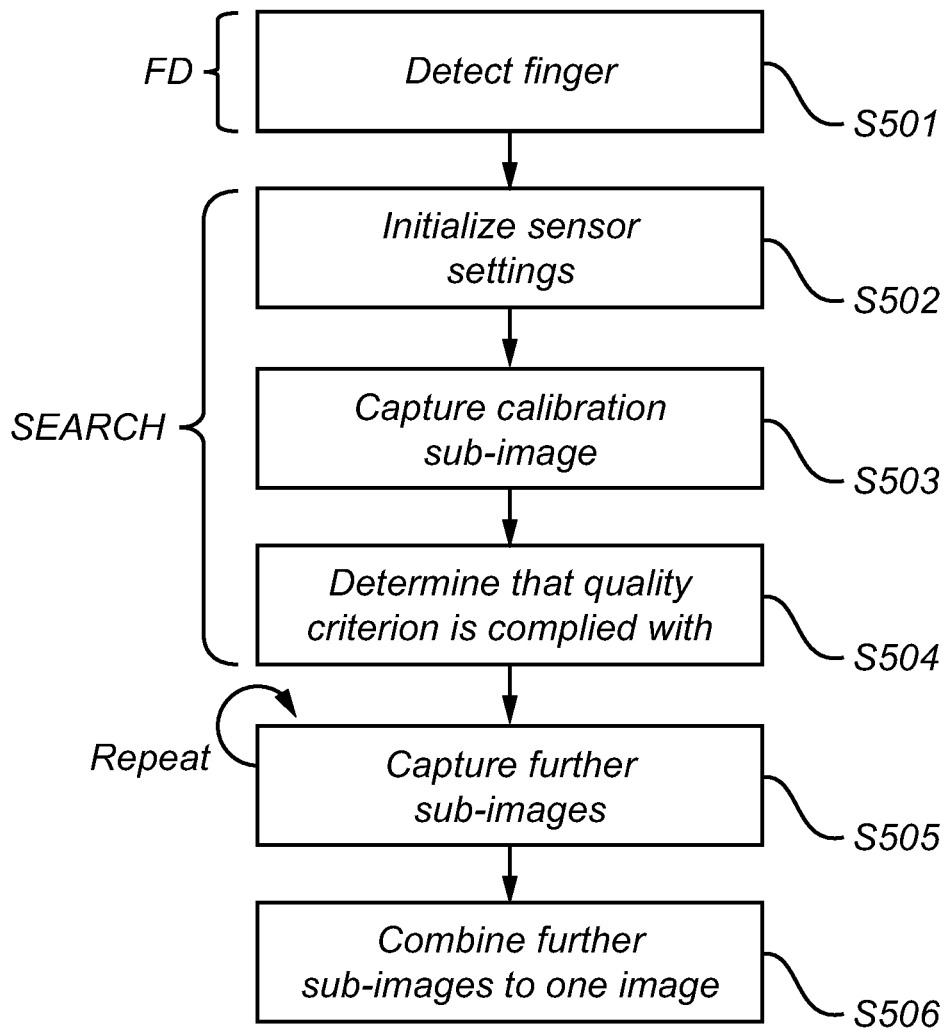
FIG. 9 illustrates a flowchart of a method of acquiring fingerprint data of a user with a fingerprint sensor in an embodiment.

FIG. 9 illustrates a flowchart of a method of acquiring fingerprint data of a user with a fingerprint sensor in an embodiment, which method advantageously complies with the restricted timing discussed with reference to FIG. 8.

Figure 10:
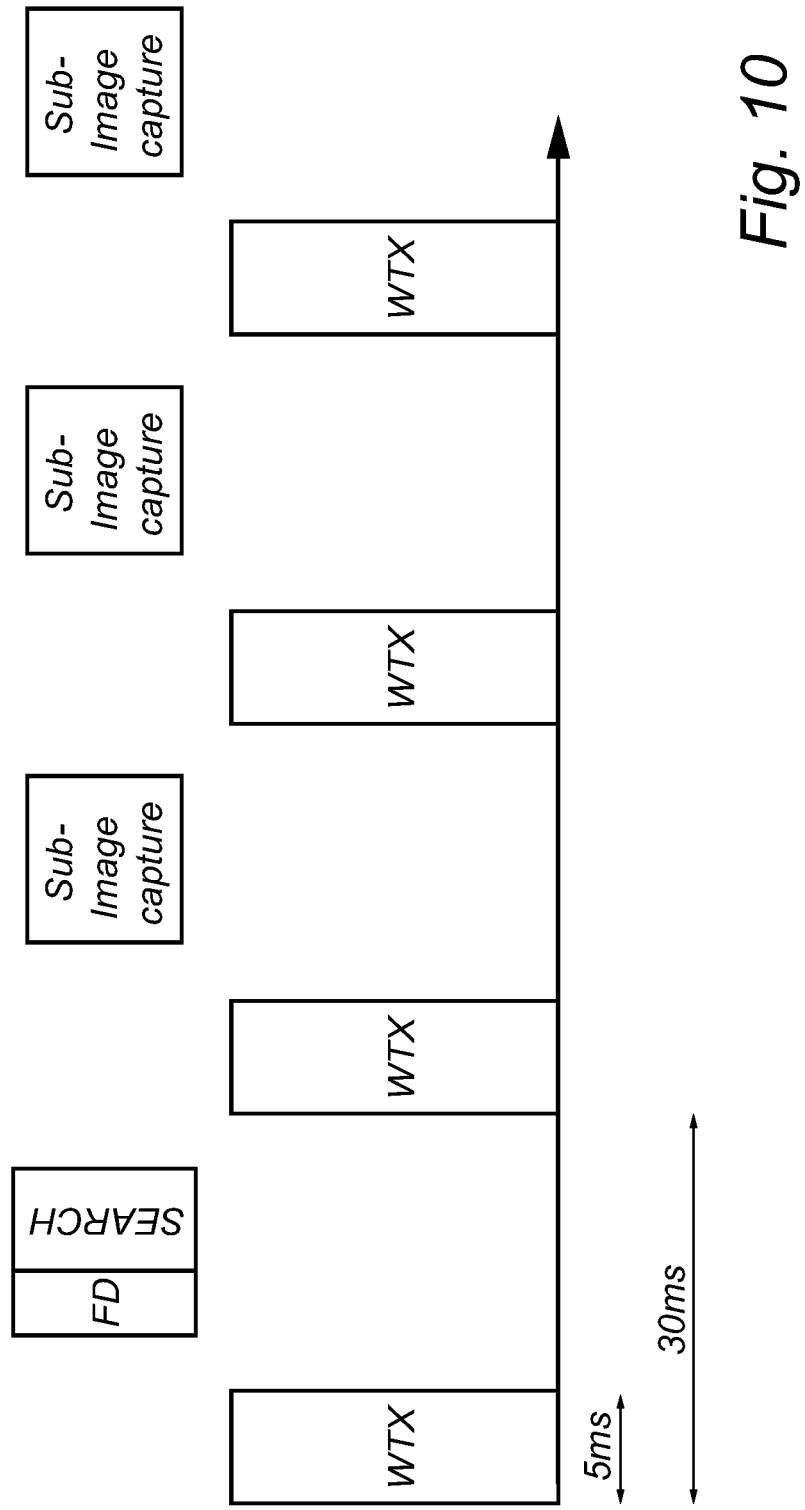
FIG. 10 shows a timing diagram illustrating various actions performed by the method of FIG. 9.

Reference will further be made to FIG. 10 showing a timing diagram illustrating various actions performed by the method of FIG. 9.

In a first step S501, the fingerprint sensor 102 detects that a finger 201 contacts a sensing area of the sensor. As previously discussed, this may be performed by determining that the number of sensing elements 202 of the sensor 102 indicated to be touched exceeds a predetermined touch threshold value. Step S501 is referred to as finger detect (FD) in FIG. 9.

Thereafter (or even before step S501), the fingerprint sensor is initialized in step S502 with a predetermined sensor setting. This may be a default setting which empirically may have proven to result in captured images of a high quality.

In step S503, a calibration sub-image is acquired, i.e. captured by the fingerprint sensor 102 being initialized with the settings of step S502. It should be noted that this calibration sub-image typically is smaller than the sub-images subsequently being captured in step S505 for the purpose of performing authentication of the fingerprint of the user; the smaller calibration sub-image captured in step S503 is used for determining whether or not the sensor settings are adequate or if they need to be adjusted. The size of the calibration sub-image is not necessarily dependent on the size of the sensor, but may be of the same dimension regardless of sensor size, such as for instance 32×24 pixels.

In order to be able to use a fingerprint image for biometric authentication of the user, the quality of the image must be sufficiently high. If not, it is not feasible to match the captured fingerprint image to previously enrolled fingerprint templates of the fingerprint sensing system 110.

Thus, in step S504, the processor 103 determines whether or not the quality of the captured calibration sub-image complies with a predetermined quality criterion. For instance, the perceived quality of the image may be graded from 0 to 100%, where 100% would correspond to a more or less perfect image.

The process 103 may conclude that the quality criterion is met for the captured calibration sub-image if the quality is assigned a value of 80% or higher, thereby indicating that the utilized sensor settings of step S502 are adequate.

In this particular exemplifying embodiment, it is assumed that the quality criterion is met with the sensor 102 being initialized with the default sensor settings in step S502. Steps S502-S504 represent an initialization process referred to as SEARCH in FIG. 9.

As can be concluded from FIG. 10, the FD and SEARCH procedure is advantageously performed during a part of the WTX period when no WTX request is sent in order to avoid that these procedures are being undertaken during a period when the smartcard 100 is harvesting energy.

Since the quality criterion is complied with, the processor 103 proceeds with controlling the fingerprint sensor 102 to capture further sub-images using the default sensor settings in step S505. As previously mentioned, these sub-images are typically larger than the calibration sub-image captured during the SEARCH process in step S503. The sub-images captured in step S505 is continuously being written into a respective location of memory as they are being captured.

The capturing of sub-images in step S505 is repeated until a sufficient number of sub-images have been captured, such that a fully or partly complete fingerprint image subsequently can be read out from the memory. For instance, 2-4 sub-images are captured and written into the memory, but this may vary dependent on configuration of the system.

After having captured a sufficient number of sub-images in step S505, these sub-images are read out, and thus combined, by the processor 103 in step S506 into one single image representing the fingerprint of the user. This will in the following be referred to as a full fingerprint image, even though it may constitute an image representing only a part of a fingerprint, which may or may not be sufficient in fingerprint feature content to allow authentication.

It is noted that the reading out of the single image from the memory is typically not performed when a WTX request is sent.

As further can be concluded from FIG. 10, the capturing of sub-images is advantageously performed during a part of the WTX period when no WTX request is sent.

As mentioned, the calibration sub-image captured in step S502 during the SEARCH phase is generally smaller in size than the further sub-images captured in step S505, which has as an advantage that the FD+SEARCH phase not necessarily is longer than the time required to capture a further sub-image in step S505.

A number of sub-images captured in step S505, e.g. 2-3 sub-images, are combined by the processor 103 to accomplish a more substantial representation of the fingerprint, and the resulting single image is subsequently compared to one or more enrolled fingerprint templates in order to find a match and thus authenticate the user.

Advantageously, the user has been authenticated without the fingerprint sensing system 110 interfering with the WTX requests transmitted from the smartcard 100 to the POS terminal 200.

Figure 11:
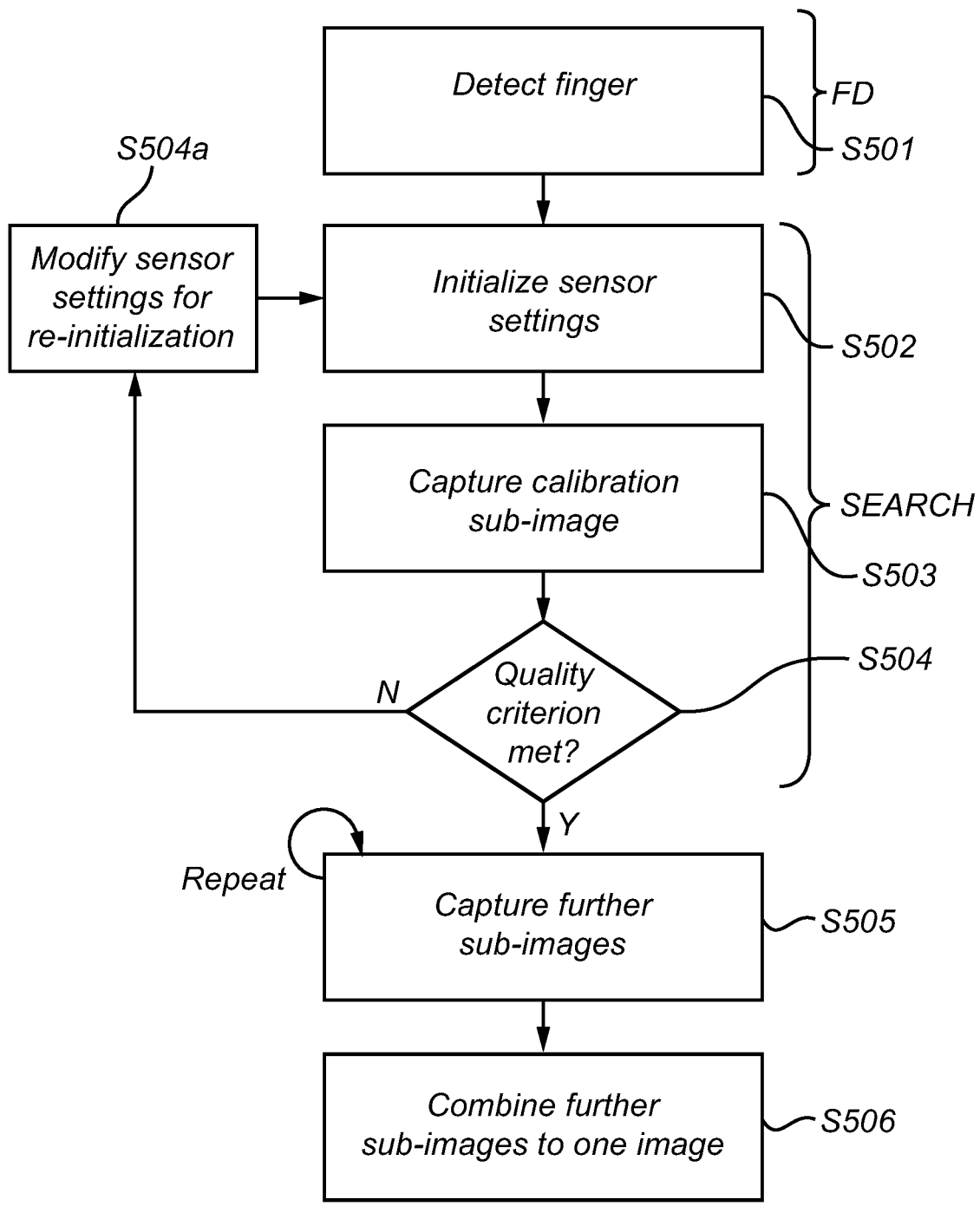
FIG. 11 illustrates a flowchart of a method of acquiring fingerprint data of a user with a fingerprint sensor in another embodiment.

FIG. 11 illustrates a flowchart of a method of acquiring fingerprint data of a user with a fingerprint sensor in another embodiment.

Figure 12:
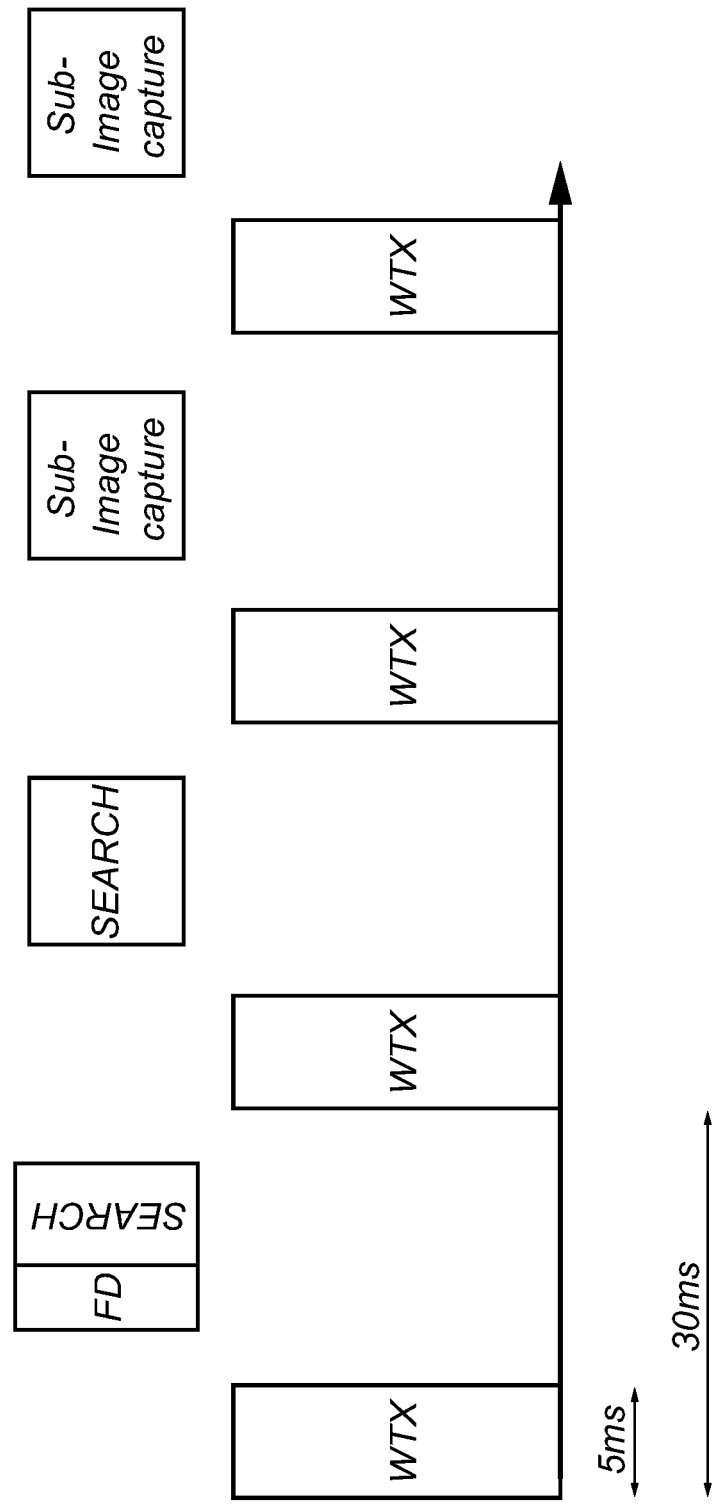
FIG. 12 shows a timing diagram illustrating various actions performed by the method of FIG. 11.

Reference will further be made to FIG. 12 showing a timing diagram illustrating various actions performed by the method of FIG. 11.

In a first step S501, the fingerprint sensor 102 detects that a finger 201 contacts a sensing area of the sensor. As previously discussed, this may be performed by determining that the number of sensing elements 202 of the sensor 102 indicated to be touched exceeds a predetermined touch threshold value. Step S501 is referred to as finger detect (FD) in FIG. 11.

Thereafter (or even before step S501), the fingerprint sensor is initialized in step S502 with a predetermined sensor setting. This may be a default setting which empirically may have proven to result in captured images of a high quality.

In step S503, a calibration sub-image is acquired, i.e. captured by the fingerprint sensor 102 being initialized with the settings of step S502.

In order to be able to use a fingerprint image for biometric authentication of the user, the quality of the image must be sufficiently high. If not, it is not feasible to match the captured fingerprint image to previously enrolled fingerprint templates of the fingerprint sensing system 110.

Thus, in step S504, the processor 103 determines whether or not the quality of the captured calibration sub-image complies with a predetermined quality criterion. As previously discussed, the perceived quality of the image may be graded from 0 to 100%, where 100% would correspond to a more or less perfect image.

The processor 103 may conclude that the quality criterion is met for the captured calibration sub-image if the quality is assigned a value of 80% or higher.

In this particular exemplifying embodiment, it is assumed that the quality criterion is not met with the sensor 102 being initialized with the default sensor settings in step S502; the quality is e.g. assigned a value of 70%. Steps S502-S504 are referred to as SEARCH in FIG. 11.

Therefore, the processor 103 modifies the sensor settings in step S504a based on data derived from the acquired calibration sub-image for which the quality criterion is not met. As previously discussed, the data derived from the image may be related to intensity from which statistical indicators are be computed to be used for modifying the sensor settings.

In step S502, the fingerprint sensor 102 is re-initialized with the modified sensor setting, whereupon a new SEARCH process is undertaken in that a new calibration sub-image is captured in step S503, the quality of which is assessed in step S504.

As can be concluded from FIG. 12, the FD, initial SEARCH and repeated SEARCH procedures are advantageously performed during a part of the WTX period when no WTX request is sent.

Since the quality criterion now is complied with in step S504, the processor 103 proceeds with controlling the fingerprint sensor 102 to capture further sub-images in step S505 using the modified sensor settings of step S504a, i.e. the most recent sensor settings for which an image is captured, the quality of which complies with the quality criterion.

After having captured and written a plurality of further sub-images to memory, these sub-images are read out from the memory by the processor 103 in step S506 and thus combined into one single image representing the fingerprint of the user as previously discussed.

As further can be concluded from FIG. 12, the capturing of sub-images is advantageously performed during a part of the WTX period when no WTX request is sent.

Figure 13:
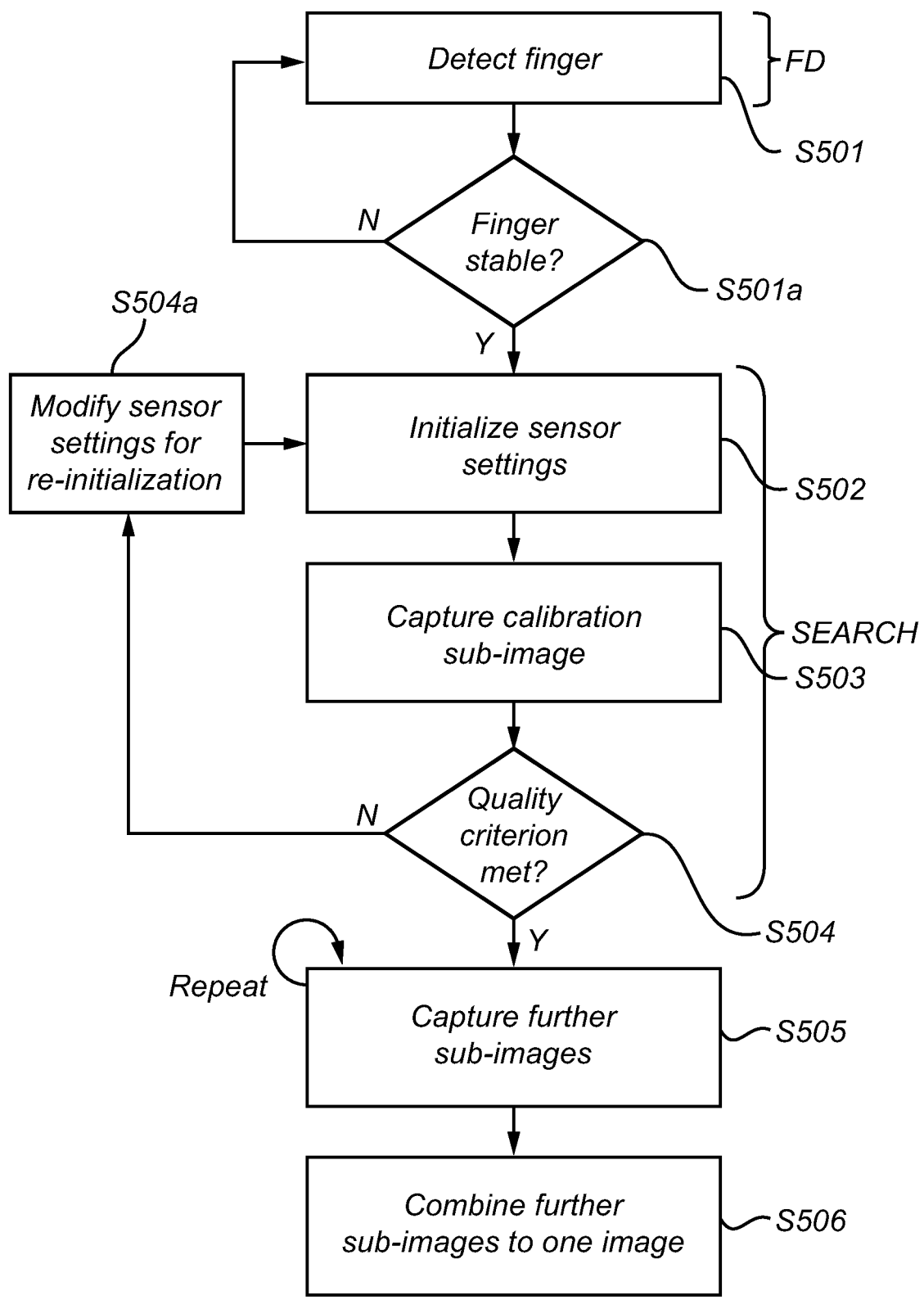
FIG. 13 illustrates a flowchart of a method of acquiring fingerprint data of a user with a fingerprint sensor in a further embodiment.

FIG. 13 illustrates a flowchart of a method of acquiring fingerprint data of a user with a fingerprint sensor in a further embodiment.

Only step S501a added with respect to the flowchart of FIG. 11 will be discussed in detail as the other steps already have been discussed with reference to FIG. 11.

After a finger is detected in step S501, the processor 103 determines in step S501a whether or not the finger is stable, e.g. by evaluating intensity parameters of the sub-image. If so, the method proceeds to step S502 as previously has been described.

However, if the finger is determined to be unstable on the sensing area of the sensor 102 in step S501a, the processor 103 re-starts the process to again determine in step S501 that a finger touches the sensor.

Advantageously, a check for finger stability is incorporated into the method with step S501a.

Figure 14:
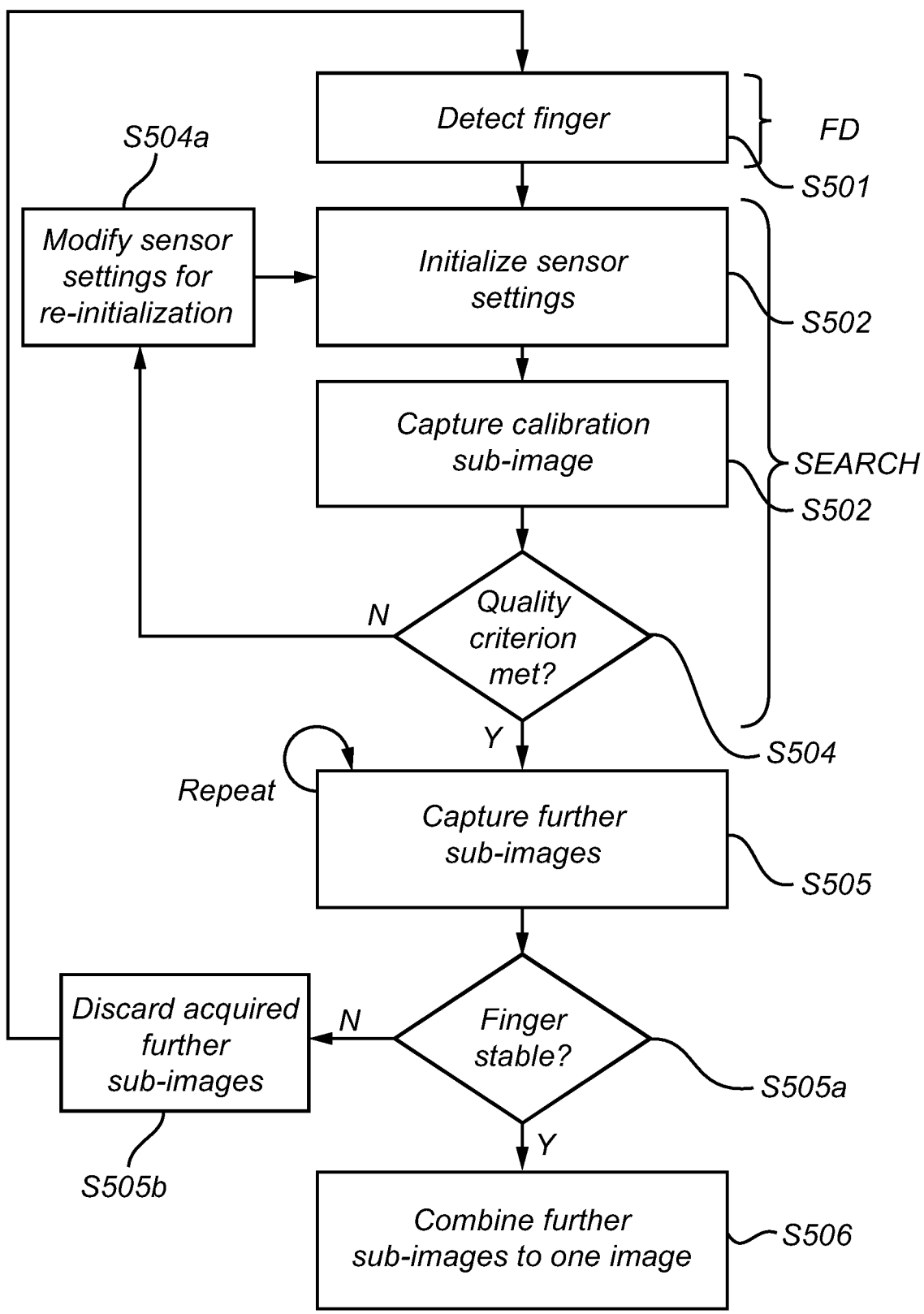
FIG. 14 shows an alternative finger stability detection approach as compared to that in FIG. 13.

FIG. 14 shows an alternative finger stability detection approach as compared to that in FIG. 13. In this embodiment, after the sub-images have been captured in step S505, the process 103 checks that the finger that was detected in step S501 still remains on the sensing area of the sensor 102.

If so, the processor 103 proceeds with reading out, from the memory, the captured sub-images forming a single image in step S506 and the process proceeds to fingerprint authentication. If not, the captured images are discarded in step S505b, and the process starts over.

It is noted that the step of reading out the sub-images forming the single image in step S506 may be performed before the step of determining whether or not the finger is stable in step S505a. Further, step S501a of FIG. 13 of performing initial finger stable detection may be added to the embodiment of FIG. 14.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a fingerprint sensing system arranged in a smartcard, the fingerprint sensing system being configured to acquire fingerprint data of a user with a fingerprint sensor for biometric authentication, comprising:
   detecting a finger of the user contacting a sensing area of the fingerprint sensor;
   initializing the fingerprint sensor with a predetermined sensor setting;
   acquiring, for the finger being detected to contact the sensing area of the fingerprint sensor, a calibration sub-image which is confined in size to a subarea of the sensing area;
   determining whether or not a quality criterion is met for the acquired calibration sub-image, and if so;
   acquiring one or more further sub-images, each of the one or more further sub-images being confined in size to a further subarea of the sensing area; and
   combining a plurality of the acquired further sub-images into a representation of a fingerprint of the user, wherein the further sub-images are acquired during a time period when the smartcard is not engaged in waiting time extension, WTX, request signalling with a card reader with which the smartcard performs contactless communication.

2. The method of claim 1, further comprising, in case the quality criterion is not met:
   modifying sensor settings based on data derived from the acquired calibration sub-image for which the quality criterion is not met; wherein the step of initializing sensor settings comprises:
   reinitializing the fingerprint sensor with the modified sensor settings; wherein the step of acquiring a calibration sub-image comprises
   acquiring a new calibration sub-image using the modified sensor settings, wherein in case the quality criterion is not met for the acquired new calibration sub-image, the sensor settings are modified until a calibration sub-image is captured for which the quality criterion is met.

3. The method of claim 2, further comprising:
   detecting whether or not the finger is stable on the sensing area and if so proceeding to initializing the fingerprint sensor with a predetermined sensor setting, and if not re-starting detection of a finger of the user contacting a sensing area of the fingerprint sensor.

4. The method of claim 2, further comprising:
detecting whether or not the finger is stable on the sensing area; and if not discarding the acquired further sub-images.

5. The method of claim 1, wherein the acquiring of any sub-images are scheduled to be performed during a part of a WTX period when the smartcard is not engaged in WTX request signalling with the card reader.

6. The method of claim 1, a captured further sub-image being written into a designated location in a memory, wherein the combining of a plurality of the acquired further sub-images into a representation of a fingerprint of the user comprises:
reading out the captured further sub-images being written into the memory, the sub-images forming the representation of the fingerprint of the user.

7. The method of claim 1, wherein one or more of the detection of a finger, detecting whether or not the finger is stable on the sensing area, and initializing and re-initializing the fingerprint sensor is performed during a time period when the smartcard is not engaged in WTX request signalling with a card reader.

8. A fingerprint sensing system arranged in a smartcard, the fingerprint sensing system comprising a fingerprint sensor being configured to acquire fingerprint data of a user for biometric authentication, and a processing unit being configured to cause the fingerprint system to be operative to:
detect a finger of the user contacting a sensing area of the fingerprint sensor;
initialize the fingerprint sensor with a predetermined sensor setting;
acquire, for the finger being detected to contact the sensing area of the fingerprint sensor, a calibration sub-image which is confined in size to a subarea of the sensing area;
determine whether or not a quality criterion is met for the acquired calibration sub-image, and if so to;
acquire one or more further sub-images, each of the one or more further sub-images being confined in size to a further subarea of the sensing area;
combine a plurality of the acquired further sub-images into a representation of a fingerprint of the user, wherein the further sub-images are acquired during a time period when the smartcard is not engaged in waiting time extension, WTX, request signalling with a card reader with which the smartcard performs contactless communication.

9. The fingerprint sensing system of claim 8, further being operative to, in case the quality criterion is not met:
modify sensor settings based on data derived from the acquired calibration sub-image for which the quality criterion is not met; wherein the step of initializing sensor settings comprises
reinitialize the fingerprint sensor with the modified sensor settings; wherein the step of acquiring a calibration sub-image comprises:
acquire a new calibration sub-image using the modified sensor settings, wherein in case the quality criterion is not met for the acquired new calibration sub-image, the sensor settings are modified until a calibration sub-image is captured for which the quality criterion is met.

10. The fingerprint sensing system of claim 9, further being operative to:
detect whether or not the finger is stable on the sensing area and if so proceeding to initializing the fingerprint sensor with a predetermined sensor setting, and if not re-starting detection of a finger of the user contacting a sensing area of the fingerprint sensor.

11. The fingerprint sensing system of claim 9, further being configured to:
detect whether or not the finger is stable on the sensing area; and if not discard the acquired further sub-images.

12. The fingerprint sensing system of claim 8, wherein the acquiring of any sub-images are scheduled to be performed during a part of a WTX period when the smartcard is not engaged in WTX request signalling with the card reader.

13. The fingerprint sensing system of claim 8, further being operative to write a captured further sub-image into a designated location in a memory, wherein the combining of a plurality of the acquired further sub-images into a representation of a fingerprint of the user comprises to:
read out the captured further sub-images being written into the memory, the sub-images forming the representation of the fingerprint of the user.

14. The fingerprint sensing system according to claim 8, further being operative to perform one or more of the detection of a finger, detection whether or not the finger is stable on the sensing area, and initializing and re-initializing the fingerprint sensor during a time period when the smartcard is not engaged in WTX request signalling with a card reader.

15. A computer program product comprising a non-transitory computer readable medium, the non-transitory computer readable medium having a computer program comprising computer-executable instructions embodied thereon for causing the fingerprint sensing system to perform steps recited in claim 1 when the computer-executable instructions are executed on a processing unit included in the fingerprint sensing system.

16. The method of claim 1, wherein the subarea of the sensing area corresponding to the calibration sub-image is smaller than the further subareas of the sensing area corresponding to the one or more further sub-images.

17. The method of claim 1, wherein each of the further subareas corresponds to a different area of the sensing area.

18. The fingerprint sensing system of claim 8, wherein the subarea of the sensing area corresponding to the calibration sub-image is smaller than the further subareas of the sensing area corresponding to the one or more further sub-images.

19. The fingerprint sensing system of claim 8, wherein each of the further subareas corresponds to a different area of the sensing area.

* * * * *